(12) United States Patent
Nakao et al.

(10) Patent No.: US 6,303,236 B1
(45) Date of Patent: Oct. 16, 2001

(54) METHOD FOR MANUFACTURING ALUMINUM-BASED COMPOSITE PLATE AND COMPOSITE BACK PLATE

(75) Inventors: Yasuhiro Nakao; Hiroto Shoji; Kunitoshi Sugaya; Takashi Kato; Takaharu Echigo, all of Sayama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/503,229

(22) Filed: Feb. 11, 2000

(30) Foreign Application Priority Data

Feb. 12, 1999 (JP) .................................... 11-034795
Mar. 24, 1999 (JP) .................................... 11-079405

(51) Int. Cl.[7] ............................. B32B 15/00; B21C 23/22
(52) U.S. Cl. ..................... 428/654; 72/31.13; 72/253.1; 83/55; 188/250 R; 188/251 R; 188/255; 188/251 A; 192/70.11; 192/70.3; 419/10; 419/19; 428/632; 428/545; 428/577; 428/539.5
(58) Field of Search .................................. 428/654, 632, 428/545, 577, 539.5; 419/10, 19; 83/55; 72/31.13, 253.1; 192/70.11, 70.3; 188/250 R, 251 R, 255, 251 A

(56) References Cited

U.S. PATENT DOCUMENTS 5,957,251 * 9/1999 Jones et al. ..................... 188/251 R

FOREIGN PATENT DOCUMENTS 59-206154    11/1984  (JP).

* cited by examiner

*Primary Examiner*—Robert R. Koehler
(74) *Attorney, Agent, or Firm*—Merchant & Gould P.C.

(57) ABSTRACT

A method for manufacturing an aluminum-based composite plate is disclosed. The method comprises the step of producing an aluminum-based composite billet. The billet production step includes reducing, by magnesium nitride, an oxide-based ceramic as a porous molded body. The reduced oxide-based ceramic has improved wettability. An aluminum alloy is then caused to infiltrate into porous sections of the reduced oxide-based ceramic to thereby provide the aluminum-based composite billet. The billet is extrusion molded into a flat plate form by using an extrusion press. Plates of desired shapes are punched from the molded flat plate by using a press.

7 Claims, 7 Drawing Sheets

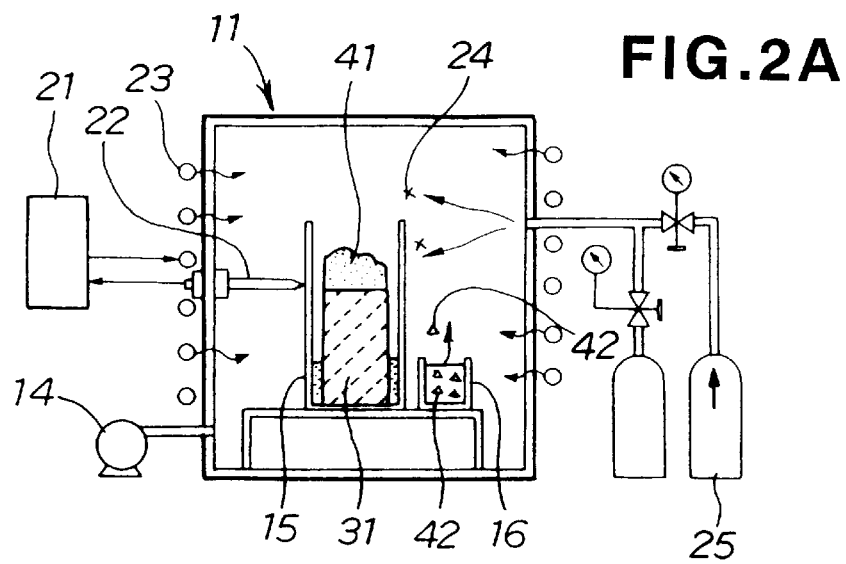
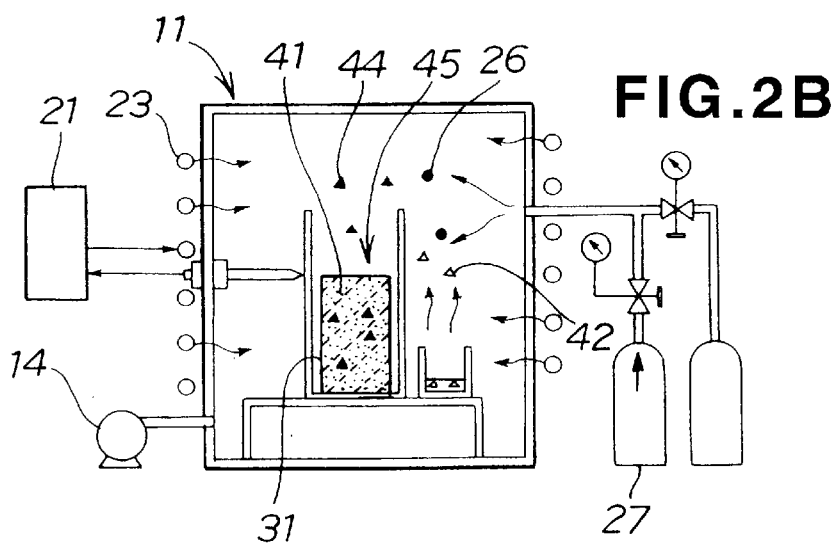
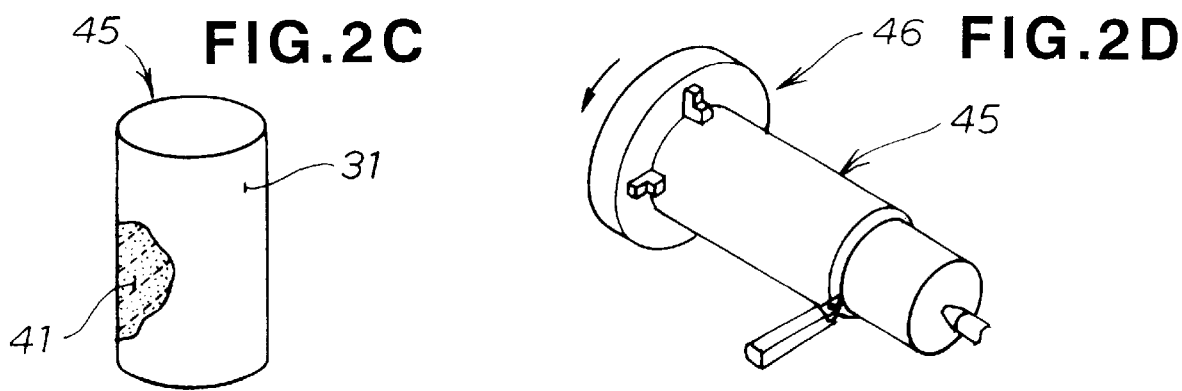

METHOD FOR MANUFACTURING ALUMINUM-BASED COMPOSITE PLATE AND COMPOSITE BACK PLATE

BACKGROUND OF THE INVENTION

1. Field of the Invention

The present invention relates to an improved method for manufacturing an aluminum-based composite plate.

2. Description of the Related Art

Automobile disk brakes have disks which are disposed parallel to tires and sandwiched on both sides by pads to thereby halt the disks by friction. The pads are housed in a caliper along with a piston for operating the pads. The pads are frictional plates each prepared by bonding a friction material (produced by thermoforming and polishing a mixture of fibers, a filler material, a friction adjuster and a binder) to a back plate (back metal). The back plates must be of high strength and lightweight because of heat and the compressive force imposed on them through the pads. Recently, it has become common to use aluminum in automobiles and motorcycles for weight reduction. In particular, use of metal-based composite materials (fiber-reinforced metal-based composite materials (FRMs) or metal matrix composites (MMCs) with aluminum as the base metal (matrix phase) has been increasing.

One known process for manufacturing products by extrusion molding of aluminum-based composite materials is "CYLINDER MANUFACTURING METHOD" disclosed in Japanese Patent Laid-Open Publication No. SHO-59-206154. The steps involved in the disclosed method are as summarized below:

(a) SiC chips are stirred and dispersed in molten aluminum, and the mixture is allowed to solidify.

(b) the solidified product is drawn while heated to about 250° C., to fabricate a pipe.

(c) the pipe is cut into a sleeve shape, fitted into a die casting metal mold and then insertion-cast with an aluminum alloy (JIS-ADC12) to thereby provide a cylinder.

The process described in Japanese Patent Laid-Open Publication No. SHO-59-206154 can be utilized to manufacture back plates used on pads of such disk brakes as described above.

However, since the composite materials manufactured by the disclosed method are obtained by combining SiC chips in molten aluminum, they have high resistance to plastic deformation so that it is not easy to work the composite materials into tubes or plates by extrusion molding. In addition, the interface between the aluminum and SIC is in a simple mechanically bonded state. Therefore, such materials exhibit low elongation and have poor workability, similarly to ordinary composite materials. Consequently, it has been a problem that these composite materials have been difficult to mold when it is attempted to obtain desired shapes by extrusion molding or the like, and that production efficiency has therefore been difficult to increase.

Furthermore, when attempts are made to cut composite materials into predetermined shapes, the composite materials manufactured by the above-described method of manufacture which include a ceramic (SiC) and hence have poor workability by machining such as cutting or polishing, thereby increasing production costs.

SUMMARY OF THE INVENTION

It is therefore an object of the present invention to provide a method for manufacturing an aluminum-based composite plate, which is easy to mold and inexpensive, as well as a back plate and a method for manufacturing the latter.

According to one aspect of the present invention, there is provided a method for manufacturing an aluminum-based composite plate, which method comprises the steps of: introducing an aluminum alloy and magnesium or a magnesium-generating source into a furnace together with a porous molded body composed of an oxide-based ceramic; reducing the oxide-based ceramic by magnesium nitride to increase wettability of the oxide-based ceramic; causing a molten aluminum alloy to infiltrate into the reduced oxide-based ceramic to provide an aluminum-based composite billet; pressing the aluminum-based composite billet into a sheet form by using an extrusion press; and punching a plate of predetermined shape out from the sheet by using a press.

Reduction of the oxide-based ceramic with magnesium nitride metallizes a porous surface and increases wettability between the oxide-based ceramic and the molten aluminum alloy. The aluminum-based composite material obtained in this manner is an aluminum-based composite material with excellent mold-ability, wherein the aluminum alloy and the reduced oxide-based ceramic as reinforcing materials are bonded with strong chemical bonds. This type of composite material facilitates extrusion molding in the subsequent press-extruding step and allows a higher extrusion ratio. As a result, it is possible to eliminate internal defects in the molded plate and achieve greater densification, thereby increasing the product quality.

Preferably, an extrusion ratio in the pressing step is set to fall in a range of 10–100, where the extrusion ratio is a value resulted from dividing a cross-sectional area of the billet before the pressing step divided by a cross-sectional area of the sheet after the pressing step. An extrusion ratio of 10 or greater will provide an aluminum-based composite material with roughly constant tensile strength and resistance. Because a larger extrusion ratio results in increased plate productivity, a larger extrusion ratio is preferred. However, if the extrusion ratio exceeds 100, the extrusion force becomes too great, thereby requiring new large-sized equipment. By setting the extrusion ratio to be within the range of 10–100, it is possible to increase the tensile strength and resistance of the aluminum-based composite material and reduce production costs by using existing equipment.

In a specific form, the composite plate may be a back plate as a constituent part of a disk brake, in which instance the pressing step may comprise placing an aluminum alloy billet closely to dies of the extrusion press, followed by positioning the aluminum-based composite billet immediately behind the aluminum alloy billet and continuously press-extruding the aluminum-based composite billet such that aluminum alloy is bonded to opposite sides or surfaces of the aluminum-based composite billet, to thereby provide a clad material of flat sheet form. The punching may comprise punching a back plate of predetermined shape out from the extruded clad material.

Upon extrusion molding, the aluminum alloy is positioned proximately to dies of the extrusion press while the aluminum-based composite billet is positioned behind the aluminum alloy. When extrusion is performed in this state, the aluminum alloy covers the aluminum-based composite material as it passes through the die. This results in continuous molding of a sheet-like form wherein the aluminum alloy is attached to both sides of the aluminum-based composite material, thereby facilitating molding of the clad material. Since both sides of the clad material are covered with an aluminum alloy of low hardness, less friction is applied to the dies during extrusion molding, thereby decreasing wear of the dies.

It is preferred that the back plate manufacturing method further comprises surface-processing the back plate to impart a desired degree of surface roughness to opposite surfaces of the back plate. In the surface-processing, the surfaces of the back plate can be ground easily and imparted with a desired level of flatness, because they are surfaced with workable aluminum alloy.

According to a second aspect of the invention, there is provided a back plate for use as a constituent part of a disk brake. The back plate is comprised of a clad material which comprises a flat sheet of aluminum-based composite material and thin plates of aluminum alloy attached to opposite sides of the flat sheet.

Preferably, the flat sheet of aluminum-based composite material comprises a porous molded body composed of oxide-based ceramics reduced by magnesium nitride, with a molten aluminum alloy infiltrated thereinto.

Since it employs an aluminum-based composite material as a core material, the back plate has increased strength and reduced thickness compared to one consisting solely of an aluminum alloy. Further, since the surfaces of the back plate are covered with an aluminum alloy of low hardness, it becomes easy to obtain desired surface roughness. Bonding a friction material to the aluminum alloy provides increased bonding strength compared to bonding the friction material used as the disk brake pad to the aluminum-based composite material.

BRIEF DESCRIPTION OF THE ACCOMPANYING DRAWINGS

Certain preferred embodiments of the present invention will hereinafter be explained in detail, by way of example only, with reference to the accompanying drawings, in which:

FIG. 2A and FIG. 2B are operation diagrams for the manufacture of an aluminum-based composite billet using the manufacturing apparatus shown in FIG. 1;

FIG. 2C is a perspective view showing a cross-section of part of a manufactured billet;

FIG. 2D is a perspective view showing the billet cut to a predetermined length by a lathe;

DETAILED DESCRIPTION OF THE PREFERRED EMBODIMENTS

The following description is merely exemplary in nature and is in no way intended to limit the invention or its application or uses.

Figure 1:
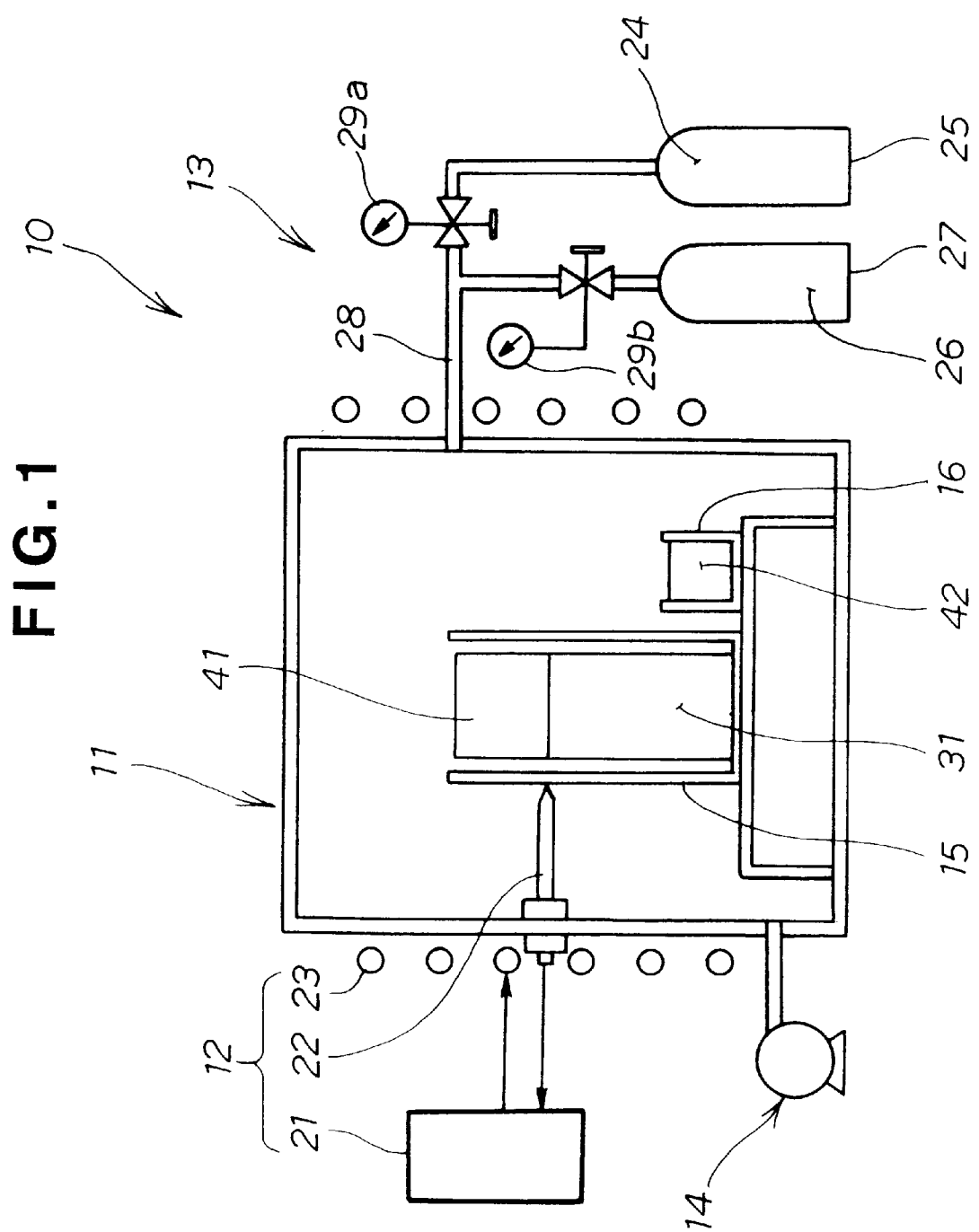
FIG. 1 is a schematic diagram illustrating a manufacturing apparatus for carrying out the process for the manufacture of an aluminum-based composite material according to the invention.

Referring initially to FIG. 1, an aluminum-based composite material manufacturing apparatus 10 comprises an atmospheric furnace 11, a heating apparatus 12 for heating the atmospheric furnace 11, a gas supply apparatus 13 for supplying an inert gas to the atmospheric furnace 11, and a vacuum pump 14 for lowering the pressure inside the atmospheric furnace 11. The atmospheric furnace 11 has a first crucible 15 and a second crucible 16.

The heating apparatus 12 has a control device 21, a temperature sensor 22 and a heating coil 23.

The gas supply apparatus 13 is provided with a first tank 25 filled with argon gas (Ar) 24, a second tank 27 filled with nitrogen gas ($N_2$) 26, a conduit 28 for allowing passage of gases supplied from the tanks 25 and 27 to the atmospheric furnace 11, and an argon gas pressure gauge 29a and a nitrogen gas pressure gauge 29b mounted on the conduit 28.

The first crucible 15 is a vessel for holding porous alumina ($Al_2O_3$) 31 serving as the oxide-based ceramic and an aluminum alloy 41. The second crucible 16 is a vessel for holding magnesium (Mg) 42. The aluminum alloy 41 used may be, for example, Alloy No. A6061 according to Japanese Industrial Standard (JIS) H-4000. A magnesium alloy may also be used instead of the magnesium (Mg) 42.

FIGS. 2A–2D illustrate a manner of manufacture of an aluminum-based composite billet according to the present invention.

First, as shown in FIG. 2A, the oxide-based ceramic, alumina ($Al_2O_3$) 31, is placed in the furnace 11 together with the aluminum alloy 41 and magnesium (Mg) 42. That is, after placing the alumina 31 in the first crucible 15, the aluminum alloy 41 is positioned on top of the alumina 31. The magnesium 42 is placed inside the second crucible 16.

Next, the inside of the atmospheric furnace 11 is evacuated with a vacuum pump 14 to remove oxygen in the atmospheric furnace 11. When a prescribed degree of vacuum has been attained, the vacuum pump 14 is deactivated. Argon gas (Ar) 24 is then supplied to the atmospheric furnace 11 from the first tank 25. The inside of the atmospheric furnace 11 is then heated with the heating coil 23.

The temperature elevation is automatically controlled by the control device 21 while detecting the temperature in the atmospheric furnace 11 with the temperature sensor 22. The aluminum alloy 41 melts during the course of reaching the prescribed temperature (for example, about 750° C. to about 900° C.). At the same time, the magnesium (Mg) 42 also melts and then vaporizes. Since the inside of the atmospheric furnace 11 is under an atmosphere of argon (Ar) 24, there is no oxidation of the aluminum alloy 41 or magnesium (Mg) 42.

Next, as shown in FIG. 2B, the inside of the atmospheric furnace 11 is pressurized by introducing nitrogen gas 26 from the second tank 27 into the atmospheric furnace 11. Specifically, nitrogen gas ($N_2$) 26 is supplied from the second tank 27 into the atmospheric furnace 11 to pressurize the inside of the atmospheric furnace 11 (for example, to atmospheric pressure+approximately 0.5 $Kg/cm^2$), so that the atmosphere of the atmospheric furnace 11 is exchanged with nitrogen gas ($N_2$) 26.

Once the atmosphere of the atmospheric furnace 11 is exchanged with the nitrogen gas ($N_2$) 26, the nitrogen gas 26 reacts with the magnesium (Mg) 42 to produce magnesium nitride ($Mg_3N_2$) 44. Reduction of the alumina ($Al_2O_3$) 31 with the magnesium nitride 44 improves the wettability of the alumina 31, and the molten aluminum alloy 41 infiltrates into the pores of the alumina 31. The aluminum alloy 41 then solidifies to complete the aluminum based-composite billet 45.

By pressurizing the atmosphere inside the atmospheric furnace 11 during the course of infiltration of the aluminum alloy 41 into the pores of the alumina 31, it is possible to accelerate infiltration and thereby manufacture an aluminum-based composite billet 45 in a shorter time than at an atmospheric pressure. The infiltration can also be accomplished in a shorter time than at an atmospheric pressure even when the pressure inside of the atmospheric furnace 11 is lowered by the vacuum pump 14 for a reduced pressure nitrogen atmosphere.

The aluminum-based composite billet 45 (hereinafter referred to simply as "billet 45") manufactured in this manner is illustrated in FIG. 2C. The billet 45 consists of alumina 31, oxide-based ceramics, with an aluminum alloy 41 infiltrated thereinto and hence has excellent moldability and can be plastically deformed easily.

Finally, as shown in FIG. 2D, the billet 45 is cut into prescribed dimensions by means of an NC (numerically controlled) lathe 46. The dimensions are determined to match the extrusion press in the following step.

Figure 3:
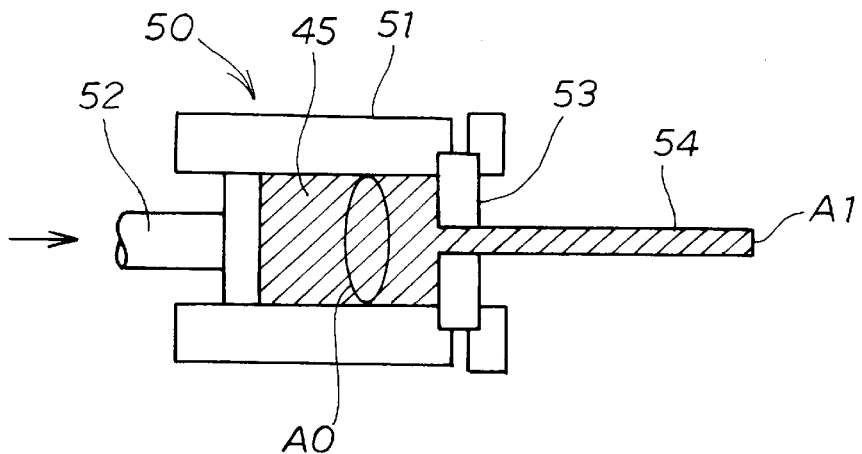
FIG. 3 is a schematic diagram illustrating the extrusion step for extrusion molding of the aforementioned billet cut to the prescribed length into a flat sheet using an extrusion press.

FIG. 3 illustrates the extrusion step for a billet in the plate manufacturing method of the present invention. The aforementioned billet 45 is inserted into the container 51 of the extrusion press 50 and extruded with a ram 52 to pass it through the die 53 in order to mold the billet 45 into a flat sheet 54. Since the billet 45 is a composite material wherein the interface between the aluminum and the reinforcing material is firmly jointed by chemical contact, the moldability is satisfactory and extrusion molding into a flat sheet 54 shape is facilitated.

Where the cross-sectional area of the billet 45 before extrusion is A0 and the cross-sectional area of the extruded flat sheet 54 is A1, an extrusion ratio R is represented by A0/A1, which is the ratio of the cross-sectional area A0 of the billet 45 before extrusion to the cross-sectional area A1 of the flat sheet 54 after extrusion. Consequently, when extrusion molding is carried out with a high extrusion ratio R, it is possible to eliminate defects in the interior of the flat sheet 54 after extrusion and to thus increase the product quality.

Figure 4:
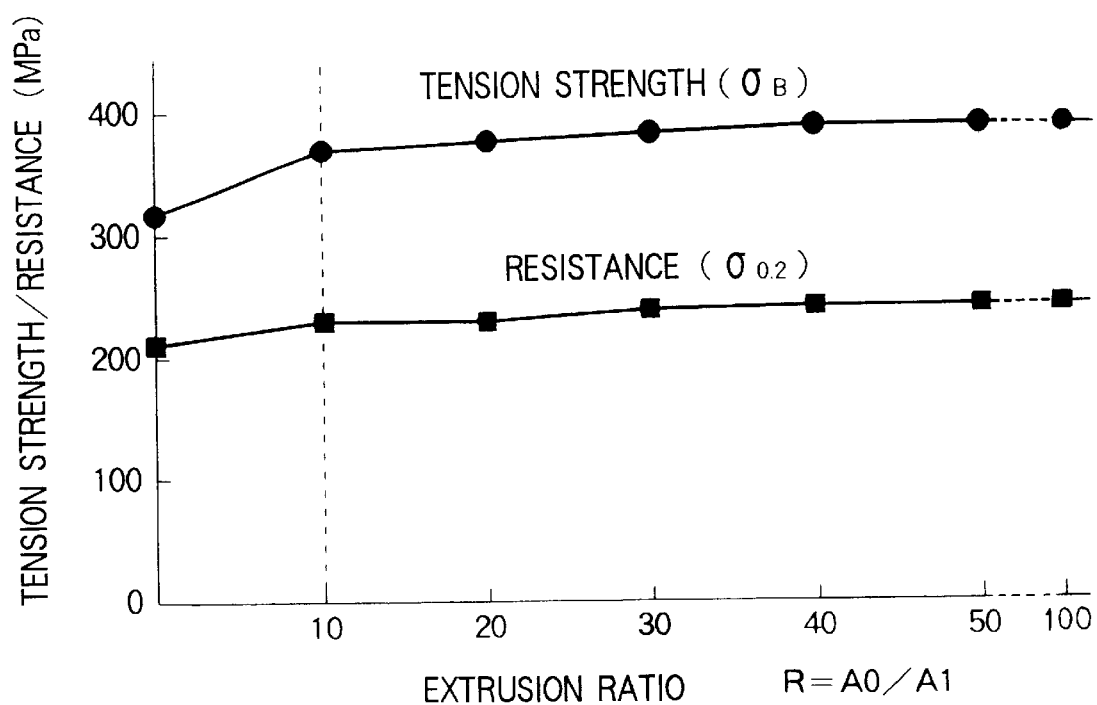
FIG. 4 is a graph showing a relationship between tensile strength and resistance of a flat sheet with respect to an extrusion ratio in the extrusion step illustrated in FIG. 3.

FIG. 4 is a graph showing the relationship between the tensile strength and resistance of the flat sheet 54 as the extrusion molded product, with respect to the extrusion ratio, wherein the extrusion ratio R is plotted on the horizontal axis and the tensile strength $\sigma_B$ and the resistance $\sigma_{0.2}$ are plotted on the vertical axis. $\sigma_{0.2}$ indicates 0.2% resistance.

When the extrusion ratio R is less than 10, the tensile strength $\sigma_B$ is proportional to the extrusion ratio R. Thus, increasing the extrusion ratio R can increase the tensile strength $\sigma_B$. Likewise, it can also increase the resistance $\sigma_{0.2}$.

When the extrusion ratio is 10 or greater, the tensile strength $\sigma_B$ is almost constant, increasing only very slightly as the extrusion ratio R increases. The resistance $\sigma_{0.2}$ is also almost constant.

Since a large extrusion ratio R results in increased productivity, a larger extrusion ratio R is preferred. However, when the extrusion ratio R exceeds 100, the extrusion force becomes too great, thus requiring new large-scale equipment. Consequently, from the standpoint of the mechanical properties of the aluminum-based composite material, the lower limit is preferably 10, while from the standpoint of equipment performance (extrusion press output) the upper limit is preferably 100.

Figure 5A:
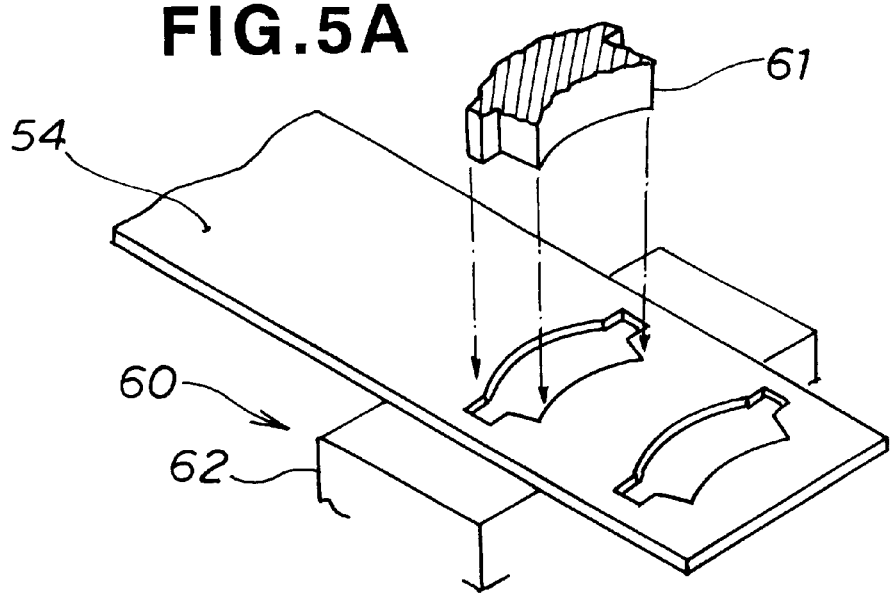
FIG. 5A is a schematic diagram illustrating the step of punching a plate into a predetermined shape from a flat sheet obtained by the extrusion step of FIG. 3.
Figure 5B:
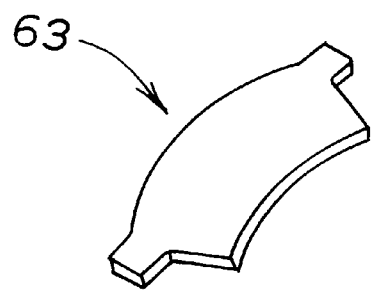
FIG. 5B is a perspective view showing an example of a disk brake pad back plate obtained by punching.

FIG. 5A is an illustration of the punching step for punching of a flat sheet 54 into a prescribed shape. The flat sheet 54 is set in a punching press 60 and the punch 61 is lowered so that the punch 61 and the die 62 cut out from the flat sheet 54 for a plate 63 of prescribed shape conforming to the shape of the punch 61, as shown in FIG. 5B. The punched plate 63 in this embodiment represents a back plate to be used for a disk brake.

Figure 6:
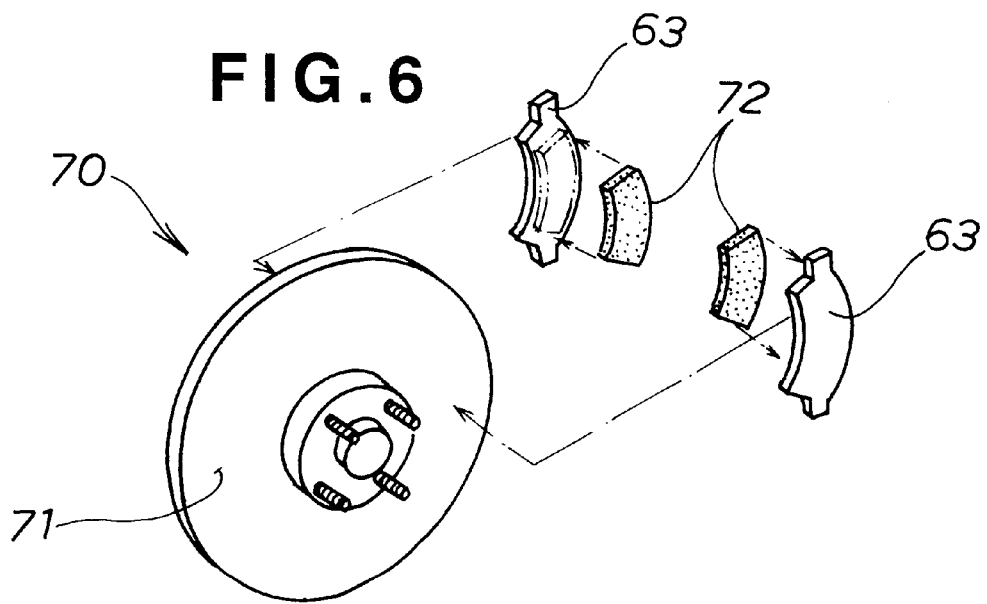
FIG. 6 is an exploded perspective view of a disk brake employing such a back plate.

FIG. 6 is an exploded perspective view of a disk brake in which back plates obtained by the plate manufacturing method described above are employed.

The disk brake 70 has a disk 71, friction materials 72 and 72 that are in contact with both sides of the disk 71 to brake its rotation by resistance, and back plates 63 and 63 for mounting the friction materials 72 and 72. The back plates 63 are made of an aluminum-based composite material and are therefore lightweight with high tensile strength, rendering them suitable as automobile parts. In this embodiment, the aluminum-based composite plate was used as a back plate, but it may also be used for other automobile or motorcycle parts. It may also be used for other industrial mechanical parts in addition to automobile parts.

Figure 7A:
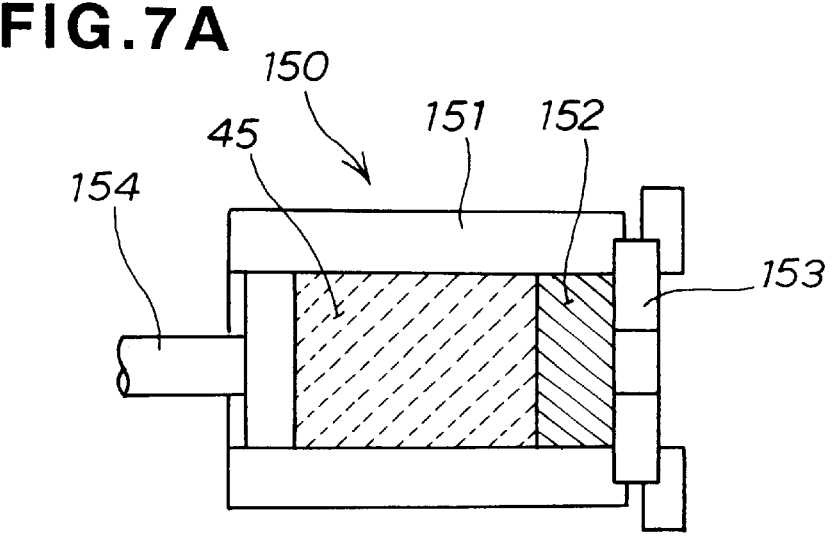
FIGS. 7A–7C are diagrams illustrating the extrusion step for extrusion molding a flat sheet-like clad material using an aluminum alloy and an aluminum-based composite material.
Figure 7B:
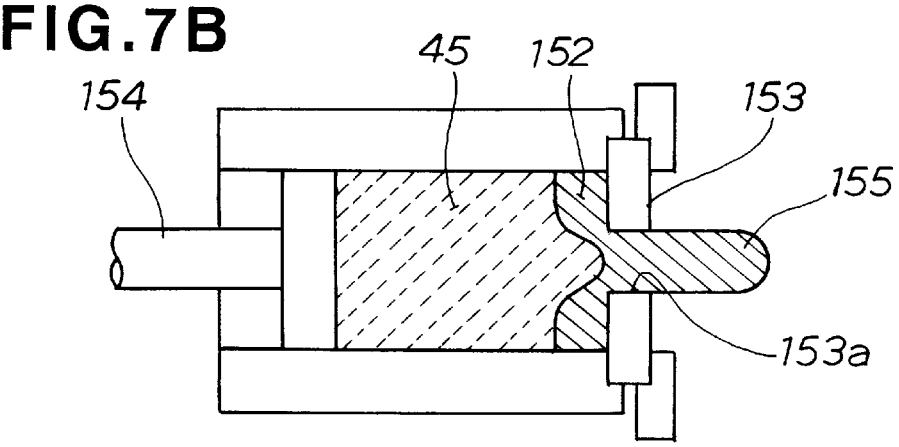
Figure 7C:
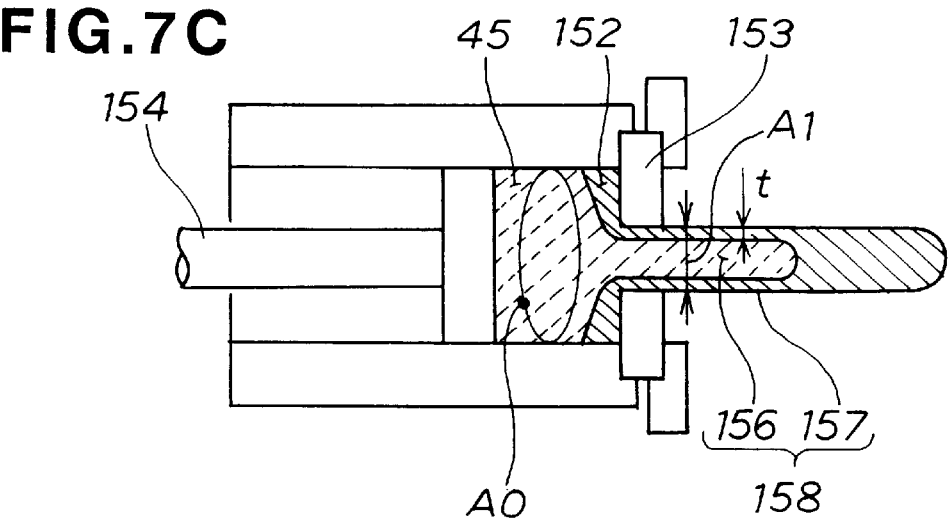

FIG. 7A, FIG. 7B and FIG. 7C illustrate an embodiment of an extrusion step wherein a clad material to be used for a back plate is molded.

Referring to FIG. 7A, an aluminum alloy billet 152 is introduced into the container 151 of an extrusion press 150 and positioned against the side of the die 153, and an aluminum-based composite billet 45 is then introduced into the container 151 at a position behind the aluminum alloy billet 152. The aluminum alloy billet 152 is preferably a corrosion resistant aluminum alloy such as, for example, an aluminum alloy of the Alloy No. A3000 Series or A5000 Series according to Japan Industrial Standards (JIS) H4000.

As shown in FIG. 7B, extrusion of the billet 45 by a ram 154 causes the aluminum alloy billet 152 to pass through the die 153 first, thereby molding a thick plate 155 of only the aluminum alloy. When the billet 45 is extruded by the ram 154, the center section of the inner surface of the aluminum alloy billet 152 is depressed into a cup shape corresponding to the exit opening 153a. The billet 45 of the aluminum-based composite material fills in the depressed section.

As shown in FIG. 7C, press extrusion of the billet 45 by the ram 154 causes the billet to pass through the die 153, thereby molding an aluminum-based composite flat sheet 156. At this time, an aluminum alloy thin plate 157 is attached on both sides of the flat sheet 156, thereby providing a flat sheet-like clad material 158.

The thickness of the thin plate 157 is designated by "t". The extrusion molding is accomplished in such a manner that the thickness t exceeds 0.2 mm. The thickness t is preferably not 0.2 mm or smaller because the aluminum alloy will tend to peel off from the aluminum-based composite material.

Because extrusion is accomplished in this manner with the aluminum alloy bonded to both sides of the aluminum-based composite material, the aluminum-based composite material does not contact directly with the die 153 and therefore no friction resistance is generated by the aluminum-based composite material, thus facilitating extrusion molding. Since it is the low-hardness aluminum alloy thin plate 157 that contacts with the die 153 during extrusion molding, the degree of friction on the die 153 is reduced so that the life of the die 153 is extended.

When the cross-sectional area of the billet 45 before extrusion is designated as A0 as in the extrusion molding illustrated in FIG. 3 and the cross-sectional area of the clad material 158 after extrusion is designated as A1 as the cross-sectional area of the flat sheet 54 shown in FIG. 3, the extrusion ratio R is represented by A0/A1 as explained in relation to FIG. 3. Since the thin plates 157 and 157 attached on both sides of the aluminum-based composite flat sheet 156 are made of an aluminum alloy with low hardness, the tensile strength and resistance of the clad material 158 are determined by the aluminum-based composite material of the flat sheet 156 which constitutes a major portion of the clad material 158. Thus, the graph showing the relationship between the extrusion ratio R and the tensile strength and resistance of the clad material 158 becomes substantially the same as the graph of FIG. 4 showing the relationship between the extrusion ratio R and the tensile strength $\sigma_B$ and resistance $\sigma_{0.2}$ of the flat sheet 54. Consequently, the extrusion ratio R for extrusion molding of the clad material 158 is preferably between 10 as the lower limit and 100 as the upper limit, as explained in FIG. 4.

Figure 8:
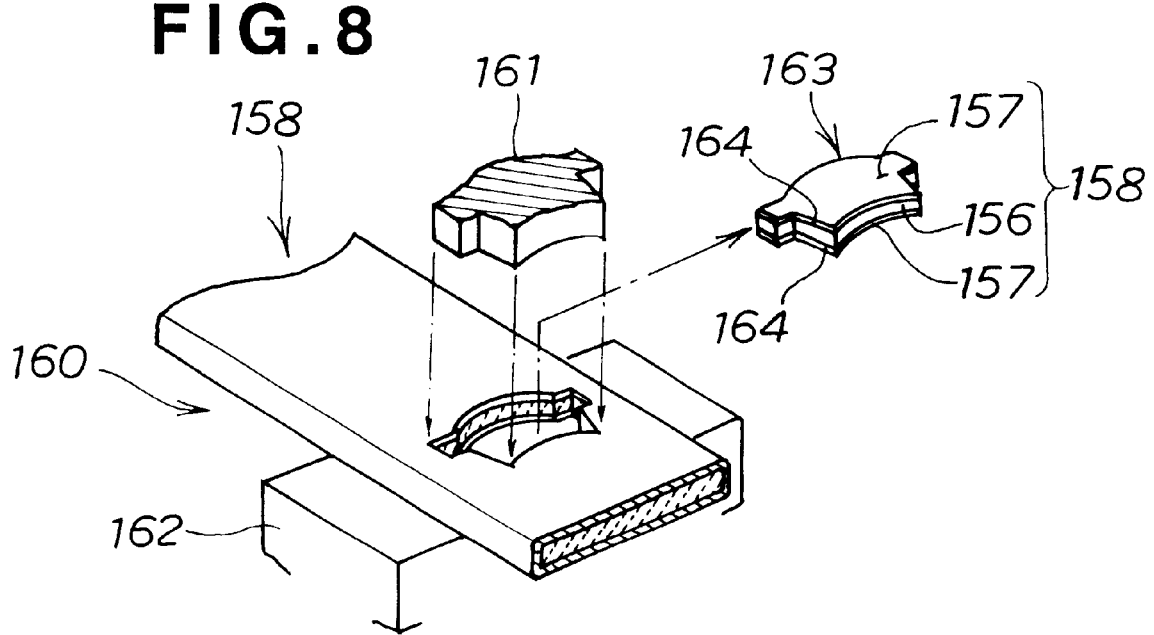
FIG. 8 is a schematic diagram illustrating a step for punching a disk brake pad back plate from the aforementioned clad material.

FIG. 8 is an explanatory diagram illustrating a punching step for manufacture of a back plate as a product from a clad material obtained by the extrusion step in FIGS. 7A–7C.

The clad material 158 is set in a press 160 and a punch 161 is lowered so that the clad material 158 is cut out by the punch 161 and the die 162 to obtain a back plate 163 with the prescribed shape from the clad material 158.

The back plate 163 is formed of the clad material 158 wherein aluminum alloy thin plates 157 and 157 are attached to both sides 164 and 164 of an aluminum-based composite flat sheet 156.

Figure 9:
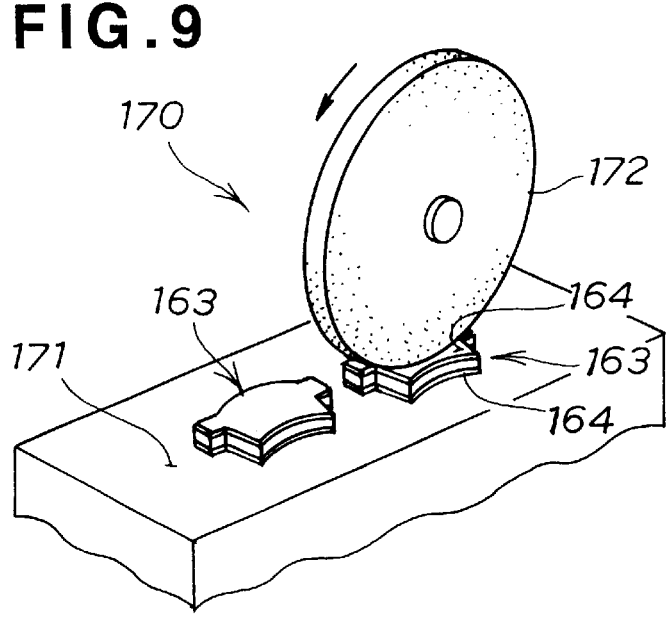
FIG. 9 is a diagram illustrating a surface-processing step in which the surface of the aforementioned back plate is worked by a grinding wheel.

FIG. 9 is a diagram illustrating a surface-processing step which accomplishes leveling of the surface of the back plate 163 obtained by the punching illustrated in FIG. 8. The back plate 163 is set on the table 171 of a grinding machine 170, and surface-grinding one side 164 of the back plate 163 by the grinding wheel 172 is followed by surface-grinding the other side 164.

The prescribed flat sides are thus obtained on both sides of the back plate 163. The flat sides have a desired surface roughness with the bonding strength for bonding a friction material described later, taken into consideration. Since both surfaces 164 and 164 of the back plate 163 are aluminum alloy surfaces, they can be easily worked and facilitate surface-grinding of the back plate 163.

Figure 10A:
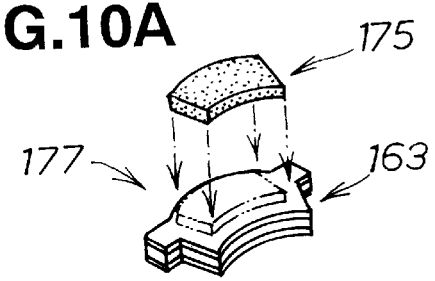
FIG. 10A is a perspective view showing the production of a pad to be used for a disk brake by bonding a friction material to one side of the aforementioned back plate.
Figure 10B:
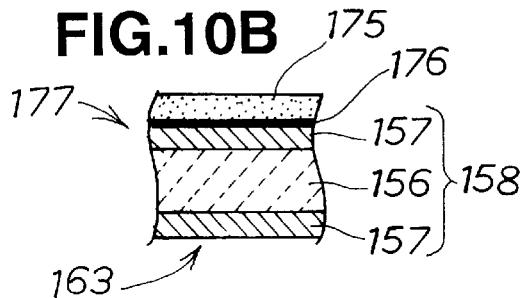
FIG. 10B is an enlarged partial cross-sectional view of the pad.

In FIG. 10A, after the back plate 163 has been washed, the friction material 175 is bonded to one side of the back plate 163 along the dotted lines to obtain a pad 177. Since bonding of the friction material 175 to the back plate 163 is accomplished by bonding of the aluminum alloy thin plate 157 of the prescribed surface roughness using an adhesive 176, as shown in FIG. 10B, the bonding strength is improved compared to direct bonding to the aluminum-based composite flat sheet 156.

The surface treatment step for the aluminum alloy in FIG. 9 is optional.

Figure 11:
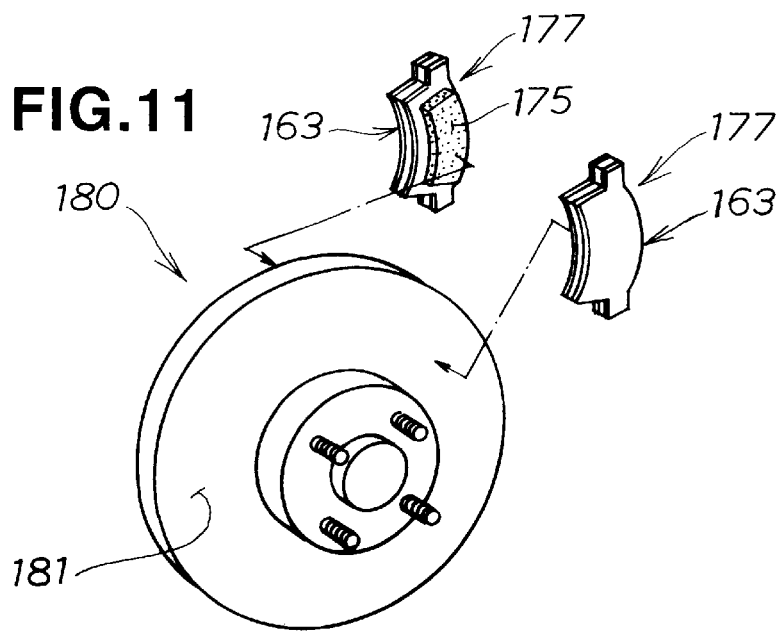
FIG. 11 is an exploded perspective view of a disk brake employing the pad, corresponding to FIG. 6.

FIG. 11 is a schematic illustration of a disk brake of the present invention, including a back plate as a constituent part thereof.

The disk brake 180 has a disk 181 and a pair of pads 177 and 177 which brake its rotation by contact with both sides of the disk 181. Each pad 177 has a structure wherein a friction material 175 for contacting with the surface of the disk 181 is bonded to a back plate 163. The back plate 163 is the clad material described above wherein an aluminum alloy is attached to an aluminum-based composite material (base metal), and it is therefore lightweight with high tensile strength as well as excellent in bonding strength with the friction material 175. It is therefore suitable as a disk brake part, which must be able to withstand poor environments such as muddy water while exhibiting high tensile strength and resistance to shear force.

In this embodiment, magnesium (Mg) was placed in the crucible for production of the magnesium nitride ($Mg_3N_2$) 44 as shown in FIG. 2B, but this is only an exemplary case and is not intended to restrict the scope of the invention. For example, magnesium may be already included in the porous molded body for production of the magnesium nitride.

Obviously, various minor changes and modifications of the present invention are possible in the light of the above teaching. It is therefore to be understood that within the scope of the appended claims the invention may be practiced otherwise than as specifically described.

What is claimed is:

1. A method for manufacturing an aluminum-based composite plate, comprising the steps of:

introducing an aluminum alloy and magnesium or a magnesium-generating source into a furnace together with a porous molded body composed of an oxide-based ceramic;

reducing said oxide-based ceramic by magnesium nitride to increase wettability of said oxide-based ceramic;

causing a molten aluminum alloy to infiltrate into said reduced oxide-based ceramic to provide an aluminum-based composite billet;

pressing said aluminum-based composite billet into a sheet form by using an extrusion press; and punching a plate of predetermined shape out from said sheet by using a press.

2. A method for manufacturing an aluminum-based composite plate, according to claim 1, wherein an extrusion ratio in said pressing step is 10–100, where the extrusion ratio is a value of a cross-sectional area of said billet before the pressing step divided by a cross-sectional area of said sheet after the pressing step.

3. A method for manufacturing an aluminum-based composite plate, according to claim 1, wherein said composite plate is a back plate as a constituent part of a disk brake, said pressing step comprises placing an aluminum alloy billet closely to dies of said extrusion press, followed by positioning said aluminum-based composite billet immediately behind the aluminum alloy billet and continuously press extruding said aluminum-based composite billet such that aluminum alloy is bonded to both sides of said aluminum-based composite billet, to thereby provide a clad material of flat sheet form, and said punching step comprises punching a back plate of predetermined shape out from said extruded clad material.

4. A method for manufacturing an aluminum-based composite plate, according to claim 3, further comprising surface-processing said back plate to impart a desired degree of surface roughness to opposite surfaces of said back plate.

5. A method for manufacturing an aluminum-based composite plate, according to claim 3, wherein an extrusion ratio in said pressing step is 10–100, where the extrusion ratio is a value of a cross-sectional area of said billet before the pressing step divided by a cross-sectional area of said clad material after the pressing step.

6. A back plate for use as a constituent part of a disk brake, said back plate being comprised of a clad material, said clad material comprising:
 a flat sheet of aluminum-based composite material; and
 thin plates of aluminum alloy attached to opposite sides of said flat sheet.

7. A back plate according to claim 6, wherein said flat sheet of aluminum-based composite material comprises a porous molded body composed of oxide-based ceramics reduced by magnesium nitride, with a molten aluminum alloy infiltrated thereinto.

* * * * *